United States Patent [19]
Gilson

[11] 3,750,047
[45] July 31, 1973

[54] GAS LASER HAVING EXCITATION CHAMBERS WITH MULTIPLE CHANNELS

[75] Inventor: Verle A. Gilson, Livermore, Calif.

[73] Assignee: The United States of America as represented by the United States Atomic Energy Commission, Washington, D.C.

[22] Filed: Aug. 25, 1972

[21] Appl. No.: 283,692

[52] U.S. Cl. .............................................. 331/94.5
[51] Int. Cl. .............................................. H01s 3/09
[58] Field of Search .................................... 331/94.5

[56] References Cited
UNITED STATES PATENTS
3,582,817   6/1971   Gilson ............................... 331/94.5

Primary Examiner—William L. Sikes
Attorney—Roland A. Anderson

[57] ABSTRACT

A gas laser excitation apparatus including means for providing an axial magnetic field and a plurality of electrodes within the laser cavity defining multiple axially adjacent excitation chambers or sections. Each excitation chamber or section is formed by two spaced parallel annular cathodes of equal radius with a coaxial tubular anode therebetween, each cathode being provided with a plurality of apertures. Successive chambers may share common cathodes so that the apparatus has alternately spaced cathodes and anodes. A potential difference applied between the anodes and cathodes causes electrons to make spiraling paths and undergo high frequency oscillations along axial magnetic field lines causing comparatively long electron lifetimes within each chamber, thereby increasing the probability of exciting particles contained therein. The plurality of apertures in the cathodes are aligned allowing a corresponding number of light beams to pass through annular channels of the excitation chambers where most gas particles in an excited state appropriate for lasing are present thereby producing a physically short but effectively long tube.

3 Claims, 2 Drawing Figures

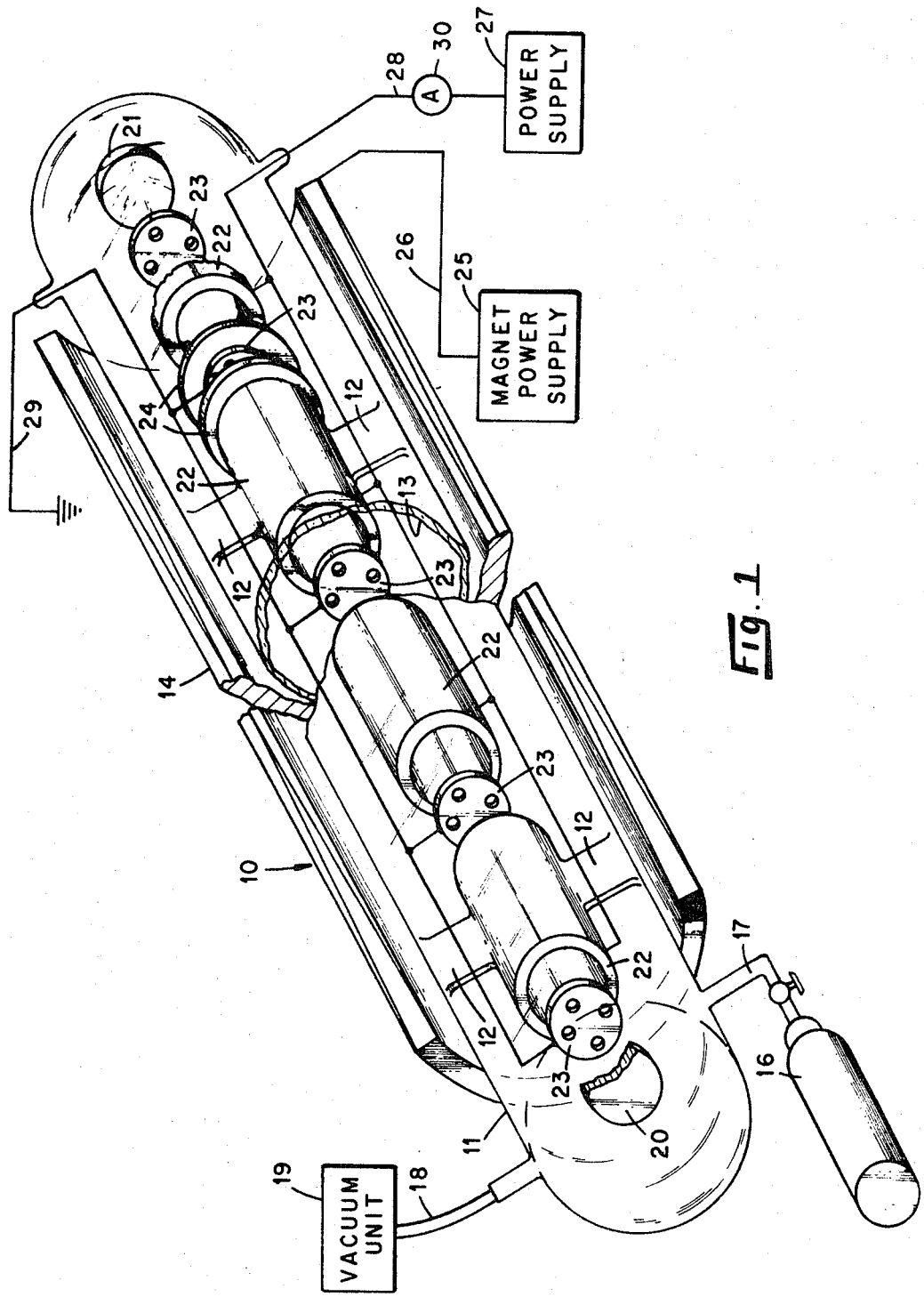

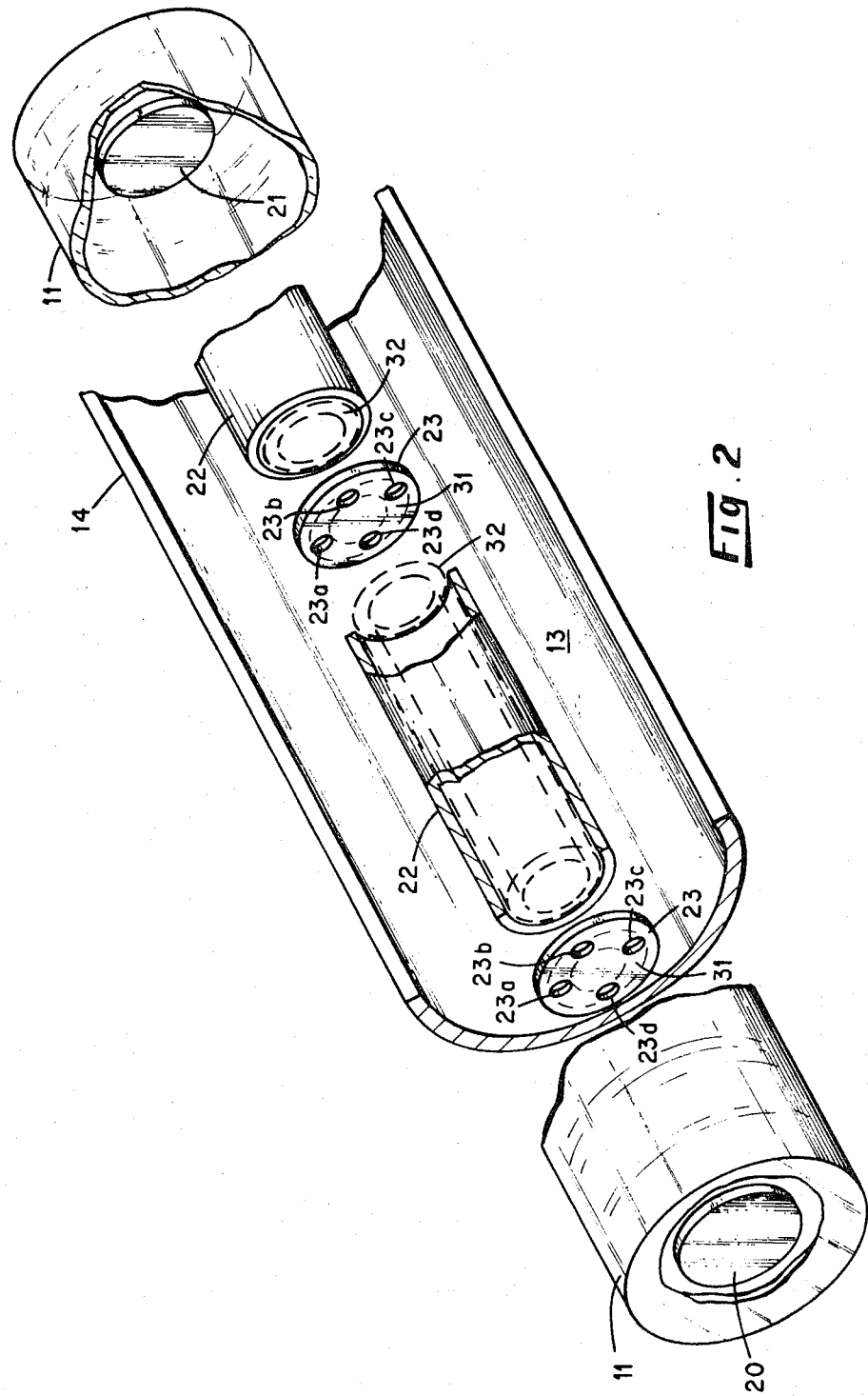

GAS LASER HAVING EXCITATION CHAMBERS WITH MULTIPLE CHANNELS

BACKGROUND OF THE INVENTION

The invention described herein was made in the course of, or under, Contract No. W-7405-ENG-48, with the United States Atomic Energy Commission.

This invention is directed to an improvement over the laser system in Applicant's U.S. Pat. No. 3,582,817, issued June 1, 1971.

SUMMARY OF THE INVENTION

The present laser excitation system constitutes an improvement over the laser system of U.S. Pat. No. 3,582,817 by providing each cathode with a plurality of apertures allowing a corresponding number of laser beams to pass through annular channels located near the interior wall surface of the tubular anodes of the excitation chambers where most gas particles in an excited state appropriate for lasing are present. As in the patented laser system, this is accomplished by the internal electrode structure being based on the Penning type discharge described, for example, in "Controlled Thermonuclear Reactions" by Glasstone and Lovberg, 1960, on pages 152 and 153. Thus, the present invention provides a novel laser excitation apparatus capable of utilizing multiple laser beams which greatly increases the gas excitation efficiency which can be employed with any lasing gas or gases (that are not suppressed by the presence of the magnetic field), thereby producing a family of gas lasers characterized by high efficiency.

Therefore it is an object of this invention to provide a laser excitation apparatus having a high power output and low threshold current.

A further object of the invention is to provide a laser excitation apparatus utilizing a plurality of adjacent excitation chambers having multiple channels within a laser cavity allowing multiple laser beams to pass therethrough wherein electrons undergo high frequency oscillations with spiraling motions along axial magnetic field lines within each chamber for exciting particles contained therein.

Another object of the invention is to provide a high efficiency laser excitation apparatus having a unique internal electrode structure allowing multiple laser beams to pass through annular channels therein and applicable with any lasing gas or gases.

Other objects of the invention will become readily apparent from the following description and accompanying drawings.

BRIEF DESCRIPTION OF THE DRAWINGS

FIG. 1 is a partially cut-away and partially exploded view of an embodiment of the invention; and FIG. 2 is a partial, enlarged view illustrating the novel electrode configuration.

DESCRIPTION OF THE INVENTION

The improvement over the laser system of U.S. Pat. No. 3,582,817 is based on the discovery that most gas particle-electron collisions in that laser system take place near the walls of the tubular anodes. Thus, in each excitation chamber, most gas particles in the excited state appropriate for lasing are present in an annular channel of the tubular anode between its inner surface and the longitudinal axis thereof. Therefore, by providing the cathode with a plurality of apertures and aligning the apertures throughout the cavity a corresponding number of laser beams are allowed to pass through the annular channels of each excitation chamber which define the regions where the optimum number of excited state gas particles are present, thereby providing improved efficiency, stability, and power output as compared to the patented laser system.

As illustrated in FIG. 1, a gas laser incorporating the inventive excitation apparatus is generally indicated at 10 and includes a magnetically permeable enclosure or envelope 11 defining a vacuum cavity or chamber 13 therein, the enclosure or envelope 11 being partially surrounded by a solenoid 14 mounted in spaced relationship therewith. For example, enclosure 11 may be constructed of glass. The enclosure or envelope 11 defining a chamber or cavity 13 is connected to a gas supply 16, such as argon, through conduit or line 17 which extends in sealed relationship through enclosure 11. A line or conduit 18 sealed in enclosure 11 is adapted to be connected to a vacuum pump 19, or other suitable means, for evacuating chamber or cavity 13. Positioned at each end of the enclosure or envelope 11 is a pair of semi-transparent reflectors or mirrors 20 and 21, which, for example, one may have a reflectivity characteristic of 95 percent and the other greater than 95 percent (about 99 percent). Mirrors 20 and 21 are mounted on the longitudinal axis of enclosure 11 and are coaxially aligned with a plurality of tubular anodes 22 and apertured cathodes 23 supported within enclosure chamber or cavity 13, by support means 12 which are secured to or integral with enclosure 11, for example, a cathode 23 being positioned at each end of each of the anodes 22. Only two pairs of support means 12 are shown for clarity and, for example, may also be constructed by glass. Each cathode 23 is provided with a plurality of apertures for reasons set forth in detail with respect to FIG. 2. Anodes and cathodes 22 and 23 may, for example, be constructed of either copper or molybdenum, the latter having been utilized in tests conducted. As shown more clearly in FIG. 2 the tubular anodes 22 and cathodes 23 have substantially the same external diameter, while the inner diameter of anodes 22 is substantially the same as a diameter scribed by a line passing through the outer edge of the apertures in cathodes 23. Each pair of the cathodes 23 with the intermediate anode 22 form an excitation chamber. Successive excitatin chambers share one common cathode 23. The chambers are adapted to economically use the majority of gas particles provided therein as described below with respect to FIG. 2. Positioned intermediate a cathode 23 and its adjacent anode 22, both sides in some instances, is an insulator spacer or member 24, only two being shown, which serves to prevent arcing between the gap separating the cathodes 23 and anodes 22. However, the gap can be made narrow enough to prevent arcing according to the popular Paschen's law and thus eliminate spacers 24. Also this spacer can be a void space in some instances. In actual practice the anodes 22, cathodes 23 and insulator spacers 24 are in abuttment one with another, and not separated to the extent illustrated in the drawing. Solenoid 14 is electrically connected to a magnet power supply 25 as indicated by lead 26. Anodes 22 are electrically connected to parallel with a high voltage power supply 27 as shown by lead 28, while cathodes 23 are connected in parallel by lead 29 to ground as indicated by conventional legend, whereby a potential difference is provided therebetween. An ammeter 30 is positioned in anode lead 28 for indicating the current flowing therethrough.

FIG. 2 illustrates portions of the FIG. 1 excitation apparatus of the present invention which takes advantage of the above-described phenomenon to provide a laser system with improved characteristics. As shown the laser cavity 13, surrounded by solenoid 14, houses axially adjacent excitation chambers formed by tubular anodes 22 and cathodes 23. Unlike the laser system of the above described patent, each cathode 23, as pointed out above, has a diameter approximately equal to that of a tubular anode 22, and is provided with N apertures, such as the four apertures 23a, 23b, 23c, and 23d. The apertures 23a–23d are equally spaced along an annular region 31, as indicated in dash lines, defined on the cathode surface which corresponds to an annular channel indicated by dash lines at 32 of the excitation chamber formed within anode 22. It is within annular channel 32 that most of the gas particles in the excited state appropriate for lasing are present, as pointed out above. The apertures 23a–23d of each cathode 23 are aligned such as to define N (four in this embodiment) straight paths parallel to the longitudinal axis of cavity 13 and through the annular channels 32 of the excitation chambers. Each end of the N paths may be provided with its own partly or fully reflecting mirror, or alternatively, the two mirrors 20 and 21, at opposite ends of cavity 13, may be shared by the N paths. Upon excitation of the gas particles in the excitation chambers to lasing levels a laser beam is generated along each of the N paths formed by cathode apertures 23a–23d through the annular channels 32 of the excitation chambers. The N paths may be folded upon each other to extend the overall effective length. The number of apertures N is limited by the spacing of them due to thermal conductivity limitations and optical irising effects.

The operation, assuming that cavity or chamber 13 has been previously pumped down or evacuated prior to connection of gas supply 16 therewith by vacuum unit 19, is as follows.

Gas from supply 16 is introduced through line 17 into the cavity 13 of enclosure or envelope 11 at a low pressure, for example, about 15 microns. Electrodes (anodes and cathodes) 22 and 23 and solenoid 14 are energized by their respective power supplies 27 and 25. Free electrons which are present rapidly accelerate toward anodes 22 within the excitation chambers defined by cathodes 23 bracketing anodes 22. Rather than hitting the anode directly, the high voltage electrons tend to spiral about the axial magnetic field lines traveling along their original direction of acceleration. When the electrons experience the relatively negative potential of a cathode in their path, they reverse their direction, following the magnetic field lines toward the opposite cathode, then reverse again, etc. Hence, electrons tend to oscillate in a spiral path at high velocities between cathodes, vastly increasing the probability that gas excitation by a collision will occur. Most of the gas particle-electron collisions occur in the annular channel of the excitation chambers. When collisions between gas particles and electrons slow the electrons, they tend to drift radially until they are collected at an anode 22. The behavior of the discharge is very complex in this pressure range, however, this description is adequate from a simplified viewpoint. Meanwhile, the gas particles have received excitation necessry to "pump" them to an energy state appropriate for lasing, this being enhanced by mirrors 20 and 21 as known in the art. The gas particles may either become ionized or merely assume a non-ionic excited state, depending on the gas selected, voltage applied, geometric dimensions, etc. In all cases, ions appear within the excitation chambers, tending to move toward cathodes 23 upon acceleration by the local anode-cathode electric field. The relative number of ions and electrons is nearly equal so that a plasma exists in the laser cavity 13 of enclosure 11. Accordingly, gas particle excitation occurs without inhibition due to space charge build-up. Enhanced excitation produces light beams (four in this embodiment) which, depending on the reflectivity characteristics of the mirrors 20 and 21 are retained within cavity 13 along the axes formed by the apertures 23a–23d of cathodes 23, which is substantially improved to effectiveness of laser optical cavities, with the beam being low cost, compared to prior devices of the same size, due to the novel electrode structure.

In an argon ion laser built in accord with the above described invention, with mirrors aligned for one axial hole and nearly aligned for two adjacent holes, three laser beams were generated simultaneously. The discharge region was 5 cm (5 cells) long. The threshold current was 100 amps. Using proper optics, these holes can be folded upon each other giving an effective gain length of 20 cm (5N).

Since the N-generated laser beams traverse excitation chamber regions where the optimum number of excited state gas particles are present, i.e., the described annular channels, the present laser system provides improved stability, and power output, while reducing the overall length of the tube, thereby advancing the state of the gas laser art.

It is thus seen that the present invention provides an improved excitation apparatus for gas lasers, thereby advancing a family of gas lasers characterized by high efficiency gained through a structure of electrodes spaced within the laser cavity, combined with an axial magnetic field extending along the length of the laser cavity.

While a particular embodiment of the invention has been illustrated and described, modifications will become apparent to those skilled in the art, and it is intended to cover in the appended claims all such modifications as come within the spirit and scope of the invention.

What I claim is:

1. In a gas laser excitation apparatus having a sealed enclosure defining a laser cavity therein, means for supplying a lasing gas to said cavity, reflector means positioned at opposite ends of said enclosure, means positioned about at least a portion of said enclosure for providing an axial magnetic field within said cavity, a plurality of anodes and a plurality of cathodes coaxially positioned in said cavity, each of said anodes being positioned intermediate a pair of said cathodes and sharing a cathode positioned therebetween such that each pair of said cathodes an an intermediate anode forming an excitation chamber, each of said reflector means, anodes and cathodes being aligned along a longitudinal axis of said enclosure, support means for said anodes and cathodes, and power supply means connected to said magnetic field providing means and to said anodes and cathodes with each of said anodes and cathodes electrically connected in parallel so as to produce a potential difference therebetween, the improvement wherein each of said plurality of anodes is of a tubular configuration and defines therein an annular channel between an inner surface thereof and the longitudinal cavity axis and wherein said plurality of cathodes are each provided with an equal number of apertures therein, said apertures being equally spaced along an annular region defined on the cathode by said annular channel of said tubular anodes, said cathodes being positioned such that the pluralities of apertures are aligned to define a plurality of light paths parallel to said longitudinal axis of said cavity and through said annular channels of the excitation chambers, whereby a plurality of light beams simultaneously traverse the annular channels of the excitation chambers wherein the optimum number of excited state gas particles are present thereby providing improved efficiency, stability and power output while reducing the overall length thereof.

2. The apparatus defined in claim 1, wherein each of said cathodes has a cross-section at least as large as the cross-section of said tubular anode inner surface.

3. The apparatus defined in claim 1, wherein each of said cathodes have an exterior cross-section approximately equal to said tubular anodes exterior cross-section, and wherein said apertures of said cathodes are positioned in said cathode within a diameter scribed by a line approximately equally to said tubular anode inner surface.

* * * * *